United States Patent
Cheng et al.

(10) Patent No.: US 12,542,797 B1
(45) Date of Patent: Feb. 3, 2026

(54) ANALYSIS AND PRIORITIZATION OF VULNERABILITIES OF CONNECTED VEHICLES

(71) Applicant: VicOne Corporation, Tokyo (JP)

(72) Inventors: Yi-Li Cheng, Taipei (TW); Jui Chang Hsu, Taipei (TW)

(73) Assignee: VicOne Corporation, Tokyo (JP)

( * ) Notice: Subject to any disclaimer, the term of this patent is extended or adjusted under 35 U.S.C. 154(b) by 282 days.

(21) Appl. No.: 18/151,819

(22) Filed: Jan. 9, 2023

(51) Int. Cl.
*H04L 9/40* (2022.01)

(52) U.S. Cl.
CPC ...... *H04L 63/1433* (2013.01); *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 10,140,453 B1* | 11/2018 | Fridakis | G06F 21/577 |
| 11,277,432 B2 | 3/2022 | Hassanzedah et al. | |
| 11,411,976 B2 | 8/2022 | Basovskiy et al. | |
| 2008/0127154 A1* | 5/2008 | Drepper | G06F 8/443 717/162 |
| 2020/0178072 A1* | 6/2020 | Hammond | G06F 21/55 |
| 2022/0150270 A1 | 5/2022 | Klein et al. | |
| 2022/0394053 A1* | 12/2022 | Sorani | G06F 21/57 |
| 2023/0289448 A1* | 9/2023 | Kashani | H04L 9/0643 |

FOREIGN PATENT DOCUMENTS

WO   WO-2023032279 A1 * 3/2023

OTHER PUBLICATIONS

Iqbal, Safras et. al., "Simulating Malicious Attacks on VANETs for Connected and Autonomous Vehicle Cybersecurity: A Machine Learning Dataset", https://www.researchgate.net/publication/358655670_Simulating_Malicious_Attacks_on_VANETs_for_Connected_and_Autonomous_Vehicle_Cybersecurity_A_Machine_Learning_Dataset, Feb. 2022.

Maple, Carsten et. al., "A Connected and Autonomous Vehicle Reference Architecture for Attack Surface Analysis", Applied Sciences, Warwick Manufacturing Group, 2019, doi:10.3390/app9235101, pp. 1-33.

(Continued)

*Primary Examiner* — Ario Etienne
*Assistant Examiner* — Mohammad Yousuf A. Mian
(74) *Attorney, Agent, or Firm* — Beyer Law Group LLP

(57) ABSTRACT

An automotive cybersecurity platform receives vulnerability alerts that may impact a connected vehicle. Software components of the connected vehicle are identified and listed. Software components that are affected by a vulnerability are identified using information from a vulnerability alert. An overall risk score of the vulnerability is determined based at least on whether the vulnerability can be triggered, how the vulnerability affects the connected vehicle when the vulnerability is triggered, and an intrinsic risk posed by the vulnerability. Remediation of the vulnerability is prioritized based at least on the overall risk score of the vulnerability.

20 Claims, 8 Drawing Sheets

(56) References Cited

OTHER PUBLICATIONS

Marksteiner, Stefan et. al., "Using Cyber Digital Twins for Automated Automotive Cybersecurity Testing", 2021 IEEE European Symposium on Security and Privacy Workshops (EuroS&PW), Vienna, Austria, 2021, pp. 123-128, doi: 10.1109/EuroSPW54576.2021.00020.

Franco da Silva, Ana Cristina et. al., "Using a Cyber Digital Twin for Continuous Automotive Security Requirements Verification" in IEEE Software, vol. 40, No. 1, pp. 69-76, Jan.-Feb. 2023, doi: 10.1109/MS.2022.3171305.

Huq, Numaan et. al., "Driving Security Into Connected Cars: Threat Model and Recommendations" https://documents.trendmicro.com/assets/white_papers/wp-driving-security-into-connected-cars.pdf, Trend Micro Research, 2020.

* cited by examiner

ANALYSIS AND PRIORITIZATION OF VULNERABILITIES OF CONNECTED VEHICLES

TECHNICAL FIELD

The present disclosure is directed to automotive cybersecurity.

BACKGROUND

A connected vehicle is a vehicle that can communicate with other devices or systems that are external to the vehicle. Most new cars on the market today are "connected" in that they have modules that can communicate with other devices that are not part of the car by wireless (e.g., WiFi, Bluetooth, broadband cellular) or wired (e.g., Universal Serial Bus (USB), proprietary ports) connection. A connected vehicle may also have sensors (e.g., camera, LIDAR) for receiving sensed data of its physical environment.

Connected vehicles typically have many electronic control units (ECUs) that perform various functions. For example, a connected vehicle may have an ECU for the head unit (also referred to as "infotainment"), an ECU for engine management, an ECU for keyless entry, an ECU for side detection, etc. ECUs are computers with software and hardware components. More particularly, an ECU has a processor that executes software in the form of an operating system, application programs, and/or firmware. Due to the complexity of ECUs, an original equipment manufacturer (OEM) of a connected vehicle obtains one or more ECUs and/or software components thereof from third-party suppliers. The reliance of an OEM on many different third-party suppliers and use of connected vehicles in public places pose serious difficulties in providing cybersecurity protection to connected vehicles.

BRIEF SUMMARY

In one embodiment, a method of analyzing vulnerabilities of connected vehicles includes identifying a plurality of software components that are utilized in electronic control units (ECUs) of a connected vehicle. A vulnerability alert is received from a vulnerability source. It is determined if any of the plurality of software components is affected by a vulnerability indicated in the vulnerability alert. A software component of the plurality of software components having the vulnerability is identified. It is determined if the vulnerability can be triggered in the connected vehicle. A threat posed by the vulnerability to the connected vehicle is analyzed. An overall risk score of the vulnerability is determined based at least on whether the vulnerability can be triggered in the vehicle, the threat posed by the vulnerability, and the intrinsic risk posed by the vulnerability. Remediation of the vulnerability is prioritized based at least on the overall risk score.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
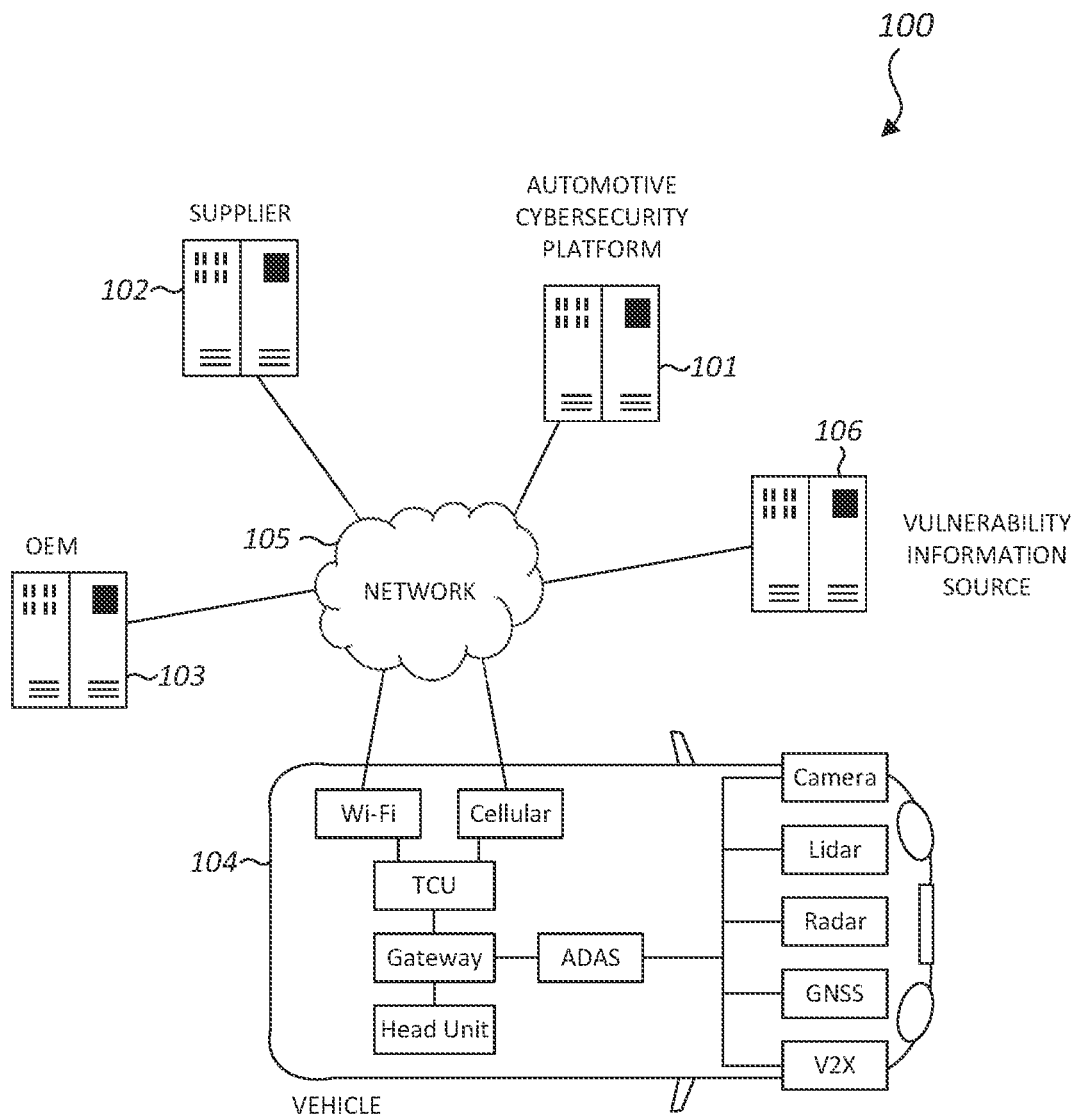
FIG. 1 shows a logical diagram of a system for analyzing vulnerabilities of connected vehicles in accordance with an embodiment of the present invention.

FIG. 1 shows a logical diagram of a system 100 for analyzing vulnerabilities of connected vehicles in accordance with an embodiment of the present invention. FIG. 1 shows a single vehicle, a single supplier, and a single OEM for illustration purposes only. As can be appreciated, there are many OEMs that manufacture connected vehicles that have modules from different suppliers.

In the example of FIG. 1, a connected vehicle 104 is made up of a plurality of modules, such ECUs for WiFi, broadband cellular, Telematic Control unit (TCU), gateway, head unit, Advanced Driver Assistance System (ADAS), camera, LIDAR, radar, Global Navigation Satellite Systems (GNSS), vehicle-to-everything (V2X), etc. One or more of the ECUs and associated software components may be provided by a third-party supplier 102 to an OEM 103, which is the manufacturer of the vehicle 104. The third-party supplier may provide firmware, source code, and/or other software components by removable storage media (e.g., USB flash storage) or over a computer network 105, which includes the Internet in this example. The OEM 103 and the supplier 102 are depicted in FIG. 1 as a computer system to indicate that the OEM 103 and the supplier 102 may send and receive software components and/or communicate with the vehicle 104 over the computer network 105.

An automotive cybersecurity platform 101 may comprise one or more computer systems for analyzing vulnerabilities of connected vehicles including the vehicle 104. The cybersecurity platform 101 may receive a vulnerability alert from a vulnerability information source 106. The vulnerability alert includes information about a newly-discovered vulnerability. A vulnerability is a flaw or weakness in an ECU that can be exploited by an attacker (e.g., hacker). The vulnerability may be in the firmware, source code, or other software component of the ECU. A vulnerability may be remediated, i.e., fixed, by updating or replacing the affected component.

The vulnerability information source 106 may comprise a computer system that provides Common Vulnerabilities and Exposures (CVE) information, news of cyber threats, feedback from a bug bounty program, or other vulnerability-related data.

The cybersecurity platform 101 is configured to identify and list software components of the vehicle 104 (e.g., software components of ECUs), receive an alert from the vulnerability information source 106 regarding a discovered vulnerability, identify one or more software components that are affected by the vulnerability, assess the risk posed by the vulnerability, and prioritize the vulnerability based on the risk. In one embodiment, the assessment of the risk posed by the vulnerability involves determining how the vulnerability affects the connected vehicle when the vulnerability is triggered (i.e., exploited), whether the vulnerability can be triggered, and a measure of an intrinsic risk posed by the vulnerability. The assessment of the risk posed by the vulnerability generates an overall risk score, which is used to prioritize the vulnerability for remediation. As can be appreciated, a connected vehicle may have many vulnerabilities. Prioritizing high-risk vulnerabilities over low-risk vulnerabilities advantageously improves cybersecurity protection of the connected vehicle.

FIGS. 2-6 show a flow diagram of a method 200 of analyzing vulnerabilities of connected vehicles in accordance with an embodiment of the present invention. The method 200, which may be performed by or on the cybersecurity platform 101, is explained in terms of a single vulnerability for illustration purposes only.

The method 200 includes a software bill of materials (SBOM) collection process 251 (FIG. 2, 251) for identifying and listing software components of the vehicle 104, a vulnerability sourcing process 252 (FIG. 2, 252) for receiving a vulnerability alert regarding a discovered vulnerability, a vulnerability scan process 253 (FIG. 3, 253) for identifying software components that are affected by the vulnerability, and a vulnerability prioritization process 254 (FIG. 4, 254) for assessing the vulnerability to generate an overall risk score of the vulnerability for prioritization purposes.

Figure 2:
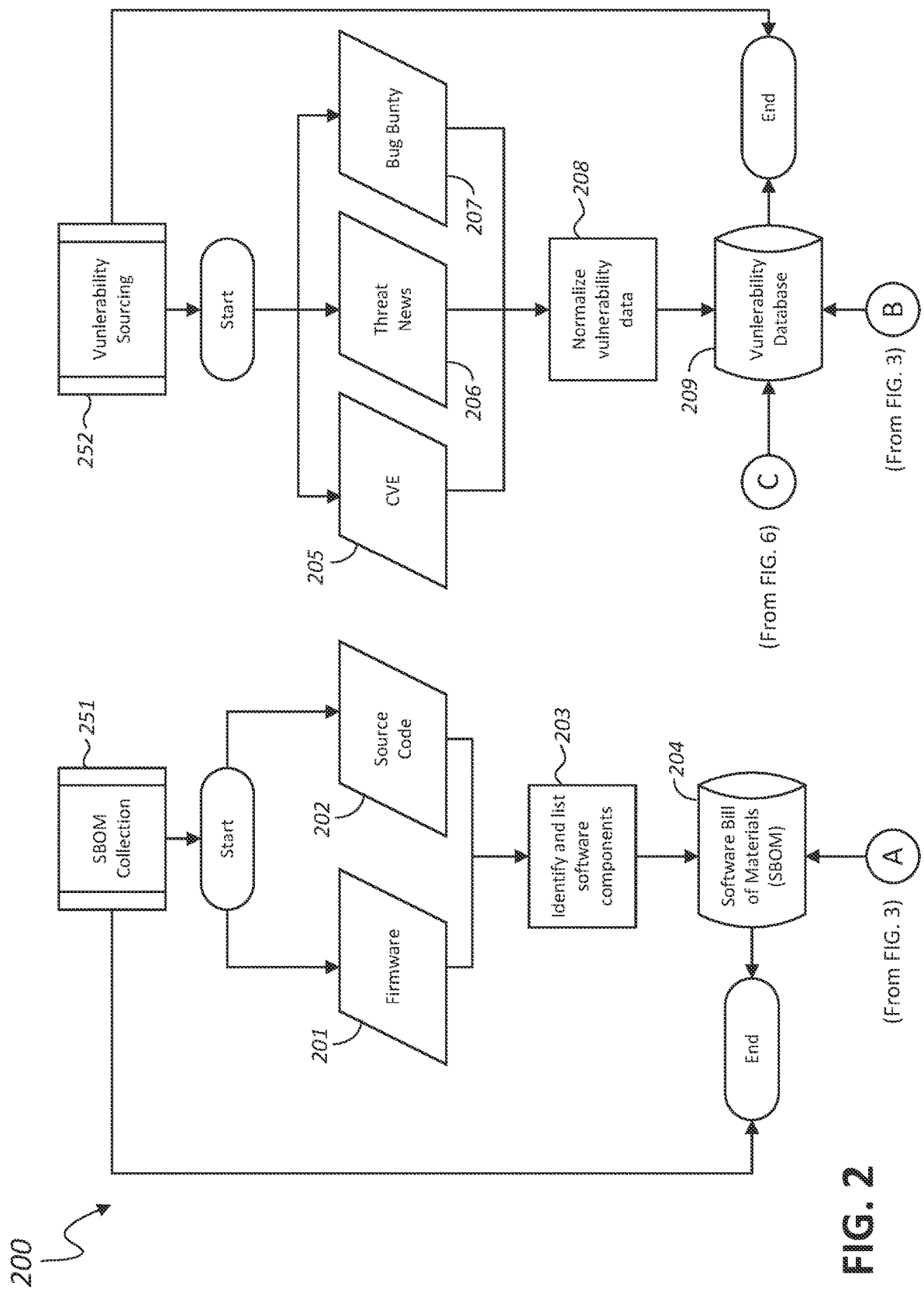
FIGS. 2-6 show a flow diagram of a method of analyzing vulnerabilities of connected vehicles in accordance with an embodiment of the present invention.

Starting in FIG. 2, the software bill of materials collection process 251 includes identifying and listing the firmware (FIG. 2, 201), source code (FIG. 2, 202), and other software components of a connected vehicle (FIG. 2, 203). The software components of the connected vehicle include software components of ECUs of the connected vehicle. An ECU may have at least one processor and a memory, e.g., dynamic random-access memory (DRAM), static random-access memory (SRAM), programmable read-only memory (PROM), etc. Software components are stored as instructions in the memory of the ECU, which when executed by the at least one processor of the ECU, cause the ECU to perform its function. An ECU may be implemented on a printed circuit board (PCB) or as system on a chip (SoC).

A software component has an identifier, such as filename, file header, hash, etc. The software components and their identifiers may be listed in a software bill of materials (FIG. 2, 204). The software bill of materials may be received from the OEM of the connected vehicle or a third-party supplier, or generated automatically by an engine or other application program (e.g., by parsing and pattern matching) that has access to the software components. The software bill of materials may be accessed to identify vulnerable software components (FIG. 2, node A to FIG. 3, node A), i.e., software components that are affected by or has the vulnerability.

Figure 6:
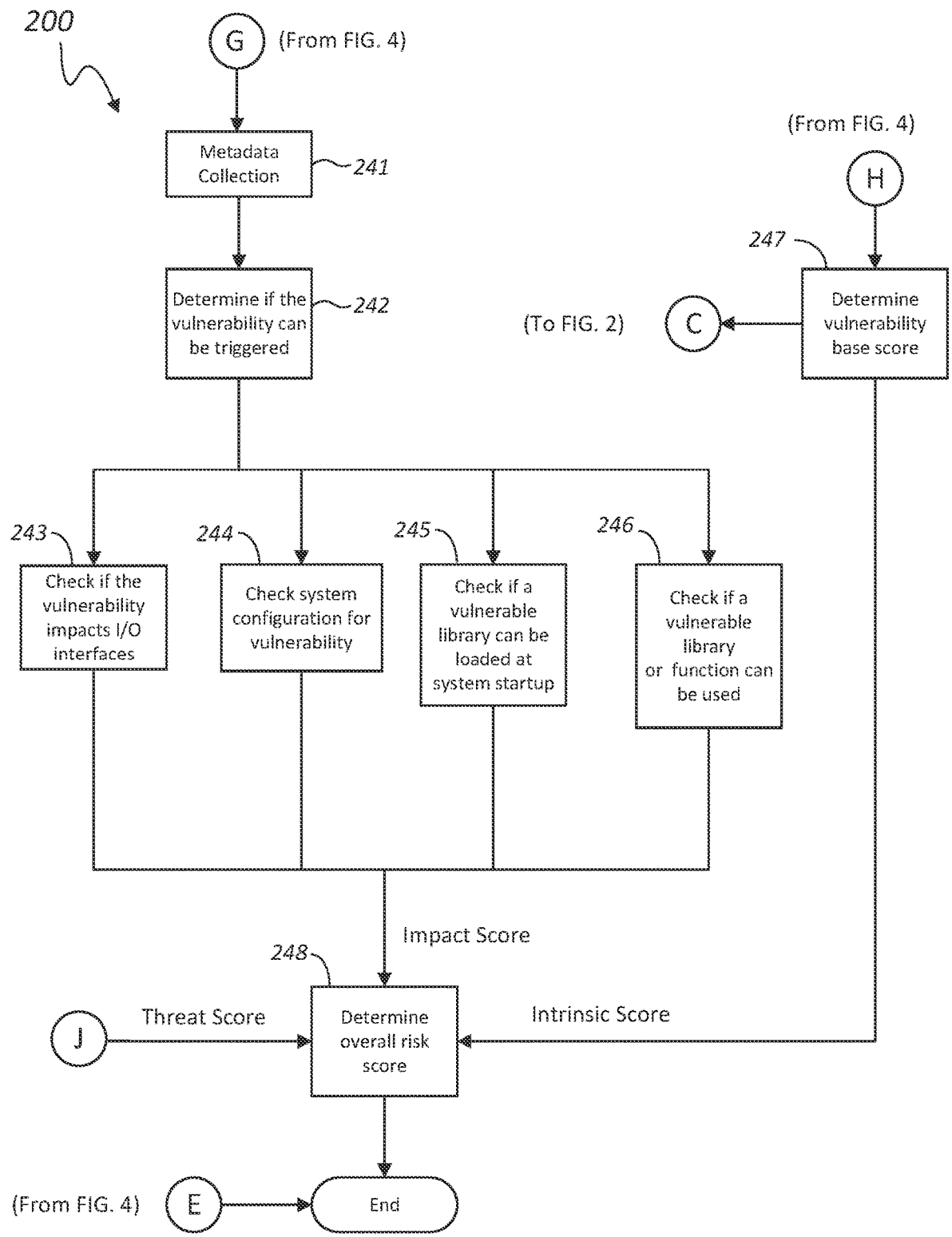

The vulnerability sourcing process 252 includes receiving a vulnerability alert from a vulnerability information source. The vulnerability alert may include vulnerability data, such as CVE records (FIG. 2, 205), cyber threat news (FIG. 2, 206), bug bounty feedback (FIG. 2, 207), etc. The vulnerability data are normalized to facilitate comparison and processing (FIG. 2, 208). The normalization step includes parsing the vulnerability data to extract attack-vector related features and putting the extracted features into a standardized data structure or format. The extracted features may include the identifier of the vulnerability, the identifier of the software component or ECU affected by the vulnerability, the base score of the vulnerability (e.g., Common Vulnerability Scoring System (CVSS) score), etc. The normalized vulnerability data are stored in a vulnerability database (FIG. 2, 209). The vulnerability database may be accessed to identify vulnerable software components (FIG. 2, node B to FIG. 3, node B) and to retrieve the base score of a vulnerability (FIG. 2, node C to FIG. 6, node C).

Figure 3:
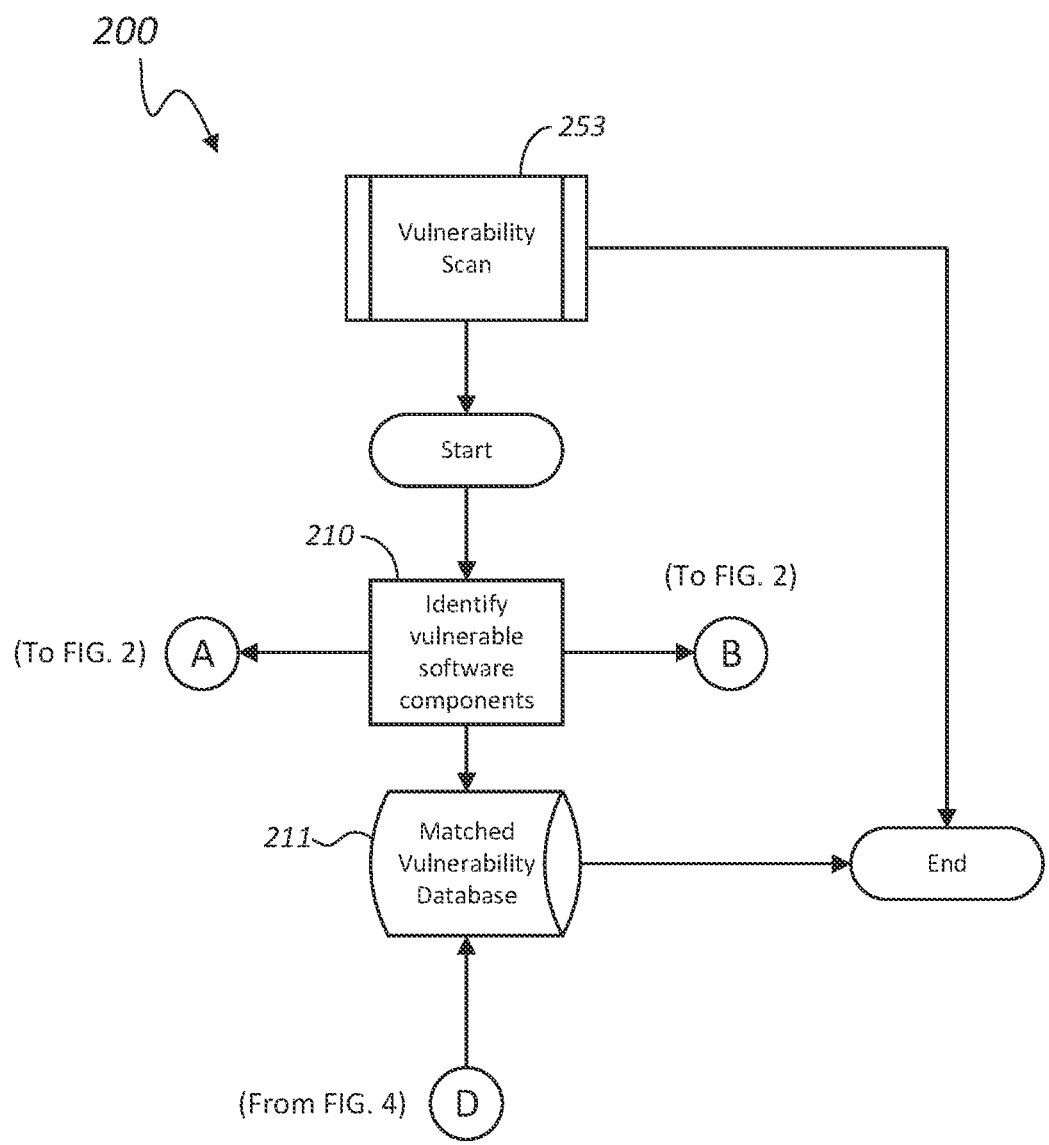

Referring to FIG. 3, the vulnerability scan process 253 includes identifying vulnerable software components of the connected vehicle (FIG. 3, 210). Vulnerable software components may be identified by comparing the contents of the software bill of materials (see FIG. 3, node A to FIG. 2, node A) to the contents of the vulnerability database (see FIG. 3, node B to FIG. 2, node B). For example, the software bill of materials may be scanned for software components that are indicated in the vulnerability database, e.g., by identifier or other characteristic, as being vulnerable. The vulnerable software components are indicated in a matched vulnerability database (FIG. 3, 211). The matched vulnerability database may be accessed to identify vulnerabilities that affect software components of the connected vehicle (FIG. 3, node D to FIG. 4, node D).

Figure 4:
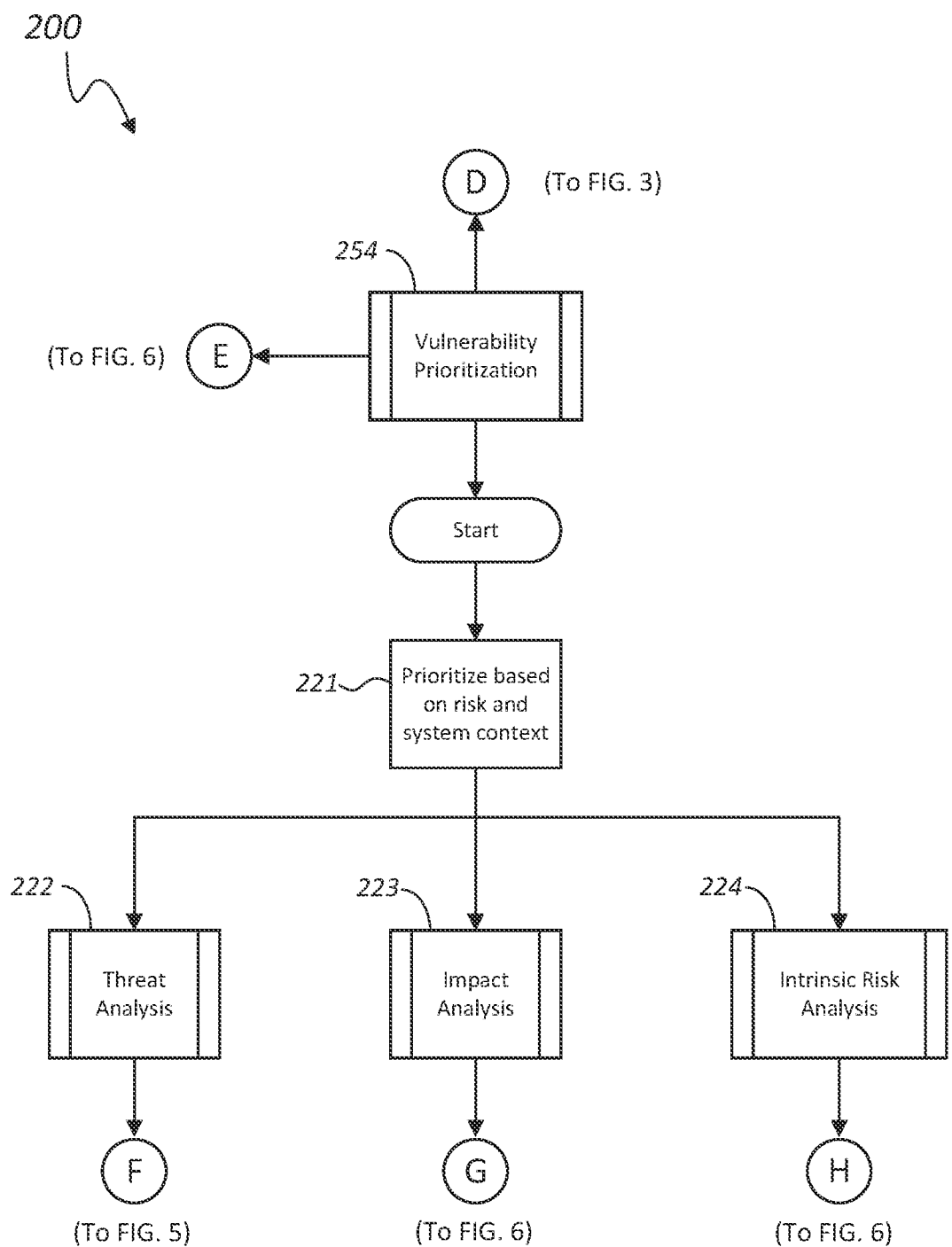

Referring to FIG. 4, the vulnerability prioritization process 254 assesses a vulnerability to generate an overall risk score of the vulnerability, which is indicative of the risk posed by the vulnerability to the connected vehicle. The higher the overall risk score, the higher the risk posed by the vulnerability. Prioritization of vulnerabilities may be based on overall risk scores, with vulnerabilities having higher risk scores being fixed or addressed before vulnerabilities with lower overall risk scores.

The vulnerability prioritization process 254 is risk-based and context-aware in that a vulnerability is prioritized based on the risk posed by the vulnerability to the connected vehicle and the context of the connected vehicle's system (FIG. 4, 221). The connected vehicle's system includes the ECUs and associated software components. The context of the connected vehicle's system is reflected by the presence, configuration, and utilization of a vulnerable software component. The vulnerability prioritization process 254 includes a threat analysis process 222, an impact analysis process 223, and an intrinsic risk analysis process 224. The processes 222, 223, and 224 may yield separate scores that may be combined to generate the overall risk score of the vulnerability.

The threat analysis process 222 determines how a vulnerability, when triggered, negatively affects the operation of the connected vehicle. The threat analysis process 222 generates a threat score, which is a measure of a negative effect of a triggered vulnerability on the operation of the connected vehicle. The higher the threat score, the more the vulnerability negatively affects the operation of the connected vehicle when the vulnerability is triggered. The threat analysis process 222 may be performed by Dynamic Application Security Testing (DAST) or other suitable testing or attack simulation methodology. The threat analysis process 222 is now further explained with reference to FIG. 5 (FIG. 4, node F to FIG. 5, node F).

Figure 5:
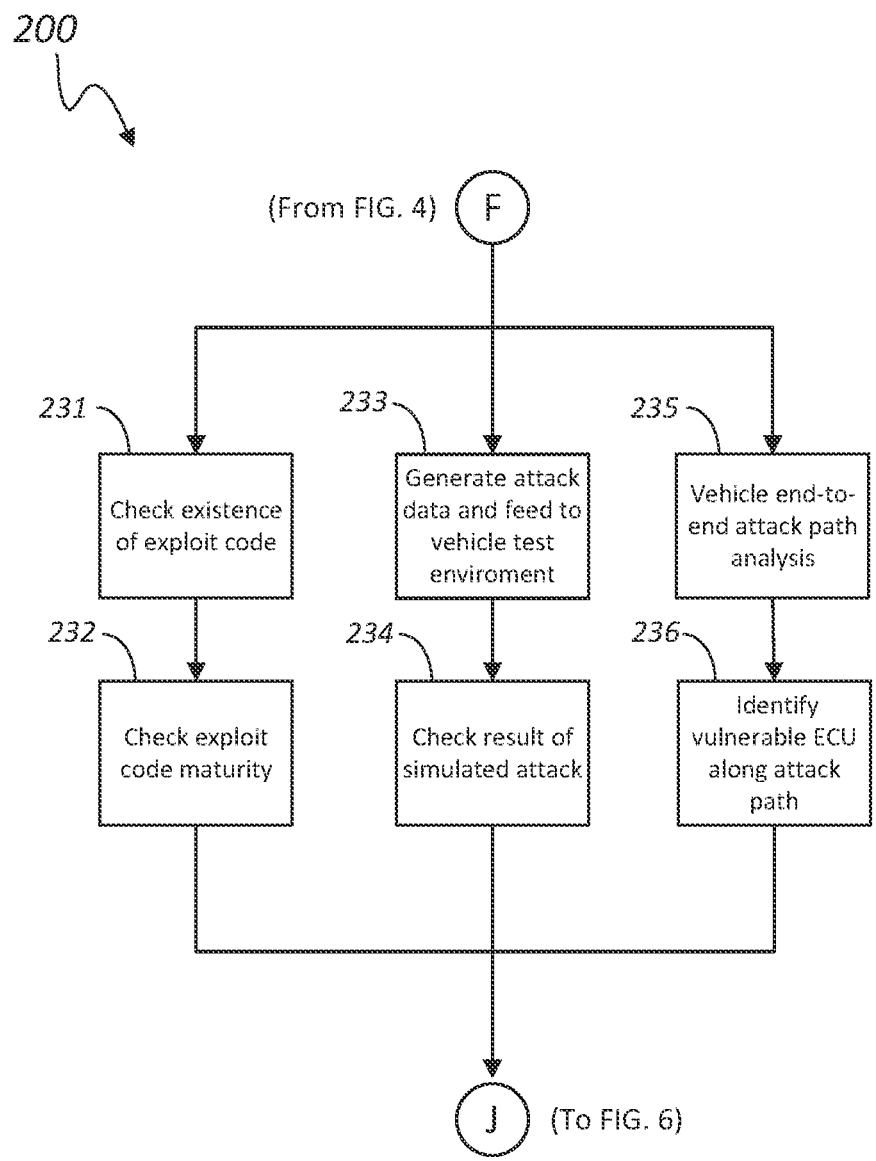

Referring to FIG. 5, the threat analysis process 222 includes checking if exploit code that can be used to exploit the vulnerability exist (FIG. 5, 231) and checking the maturity of the exploit code (FIG. 5, 232). Exploit maturity is the likelihood that the exploit code will be used to exploit a corresponding vulnerable software component. Exploit maturity is based on availability of the exploit code, whether the exploit code is autonomous, etc. The threat score may be generated based at least on whether the exploit code exists and on the maturity of the exploit code.

The threat analysis 222 process further includes performing a simulated attack on the connected vehicle by generating attack data and feeding the attack data to a test environment of the connected vehicle (FIG. 5, 233). The simulated attack exploits the vulnerability for testing purposes. The results of the simulated attack are checked to determine how the triggered vulnerability negatively affects the connected vehicle (FIG. 5, 234). The threat score may be generated based at least on the results of the simulated attack.

The attack data may be generated using known information on how to exploit the vulnerability. Known ways of exploiting a vulnerability may be applied on the test environment of the connected vehicle. For example, if the vulnerability involves sending malicious data over WiFi that is enabled in the connected vehicle, malicious data may be input into the WiFi interface of the test environment to determine how the malicious data affects the operation of the connected vehicle.

The test environment of the connected vehicle may be a virtual test environment. For example, the test environment may include a Software-Defined (SD) model of the connected vehicle. The attack data may be fed to the SDV model to test the connected vehicle. Examples of vehicle-specific attack simulation tools that may be adapted to perform threat analysis include the Eclipse KUKSA platform and the Eclipse SUMO simulation package. Non-vehicle-specific simulations tools that may be adapted to perform threat analysis include the Rapid METASPLOIT testing framework. The test environment of the connected vehicle may also be a physical test environment, such as a mockup that includes a vulnerable ECU, i.e., an ECU that is affected by or has the vulnerability. The attack data may be input to the vulnerable ECU to test how the ECU, with the vulnerable software component running thereon, operates under attack.

The threat analysis process 222 further includes performing a vehicle end-to-end attack path analysis (FIG. 5, 235) to identify one or more ECUs that are along the attack path (FIG. 5, 236). More particularly, vulnerable ECUs are identified by analyzing the path taken by an attack through the connected vehicle to exploit the vulnerability. As an example using FIG. 1, a vulnerability in a software component of an ADAS ECU may be attacked using an exploit that includes unauthorized intrusion through the WiFi, TCU, and Gateway ECUs before reaching the ADAS ECU. In that case, the attack path includes the WiFi, TCU, Gateway, and ADAS ECUs. As another example, the vulnerability in the software component of an ADAS ECU may be attacked using an exploit that includes spoofing location data of the GNSS ECU. In that case, the attack path includes the GNSS ECU and the ADAS ECU. The threat score may be generated based at least on the ECUs in the attack path. For example, each ECU may be assigned a predetermined score and the threat score includes the sum of the scores of the ECUs along the attack path. The score assigned to each ECU may depend on the ECU's impact on vehicle safety and operations. For example, a vulnerability that affects an engine management ECU may be assigned a higher score than a vulnerability that affects a mirror control ECU.

Referring back to FIG. 4, the impact analysis process 223 determines whether the vulnerability can be triggered (i.e., can be exploited) in the connected vehicle. The impact analysis process 223 generates an impact score, which is indicative of the likelihood the vulnerability can be exploited.

The impact analysis process 223 is now further explained with reference to FIG. 6 (FIG. 4, node G to FIG. 6, node G). The impact analysis process 223 includes collecting metadata of software components (FIG. 6, 241) to determine if the vulnerability can be triggered (FIG. 6, 242). In one embodiment, the vulnerability can be triggered if the vulnerability impacts an I/O interface (FIG. 6, 243), if the vulnerability impacts the connected vehicle's system (FIG. 6, 244), if a vulnerable library can be loaded at system startup (FIG. 6, 245), and/or if a vulnerable library or function can be used in the connected vehicle's system (FIG. 6, 246).

The metadata collection step (FIG. 6, 241) may include obtaining executable metadata, system metadata, and I/O interface metadata. The metadata collection step may be obtained by Binary Code Analysis (BCA) or other suitable code analysis technique.

The executable metadata include metadata of library dependencies and symbol tables. The executable metadata may be used to determine if a vulnerable function or library is loaded during system startup or used in a running process. For example, a CVE record from a vulnerability alert may include the name of a vulnerable function in a vulnerable library. The vulnerable function noted in the CVE record is deemed to be triggerable when the vulnerable function is loaded during startup of an ECU in the connected vehicle.

The system metadata include metadata of system configuration (including kernel configuration), list of processes that are run, the type of the processor of the ECU, and system policies. The system policies metadata indicate if a vulnerability is covered or addressed by a system policy, such as Internet Protocol (IP) table rules and firewall rules.

The I/O interface metadata include metadata of I/O interfaces, such as USB, Bluetooth, WiFi/Cellular, etc. interfaces. The I/O interface metadata include data on available I/O interfaces, I/O configuration, I/O scripts, etc.

The collected metadata may be consulted to determine if the vulnerability can be triggered. In other words, the collected metadata may be consulted to determine if the vulnerability affects a particular component or configurable option that is utilized during operation of the connected vehicle. For example, the vulnerability can be triggered if the vulnerability affects a particular software component in a library and the executable metadata indicate that the software component is loaded during startup of an ECU in the connected vehicle. As another example, the vulnerability cannot be triggered if the vulnerability attacks a particular version of an operating system, and the system metadata indicate that the connected vehicle does not use that particular version of the operating system. Yet another example, the vulnerability can be triggered if the vulnerability affects USB connections and the I/O interface metadata indicate that the connected vehicle has a USB port.

The impact analysis process 223 includes checking if the vulnerability impacts an I/O interface (FIG. 6, 243). The I/O interfaces of the connected vehicle may include interfaces for USB, Bluetooth, WiFi/Cellular, camera, LIDAR, RADAR, GNSS, V2X, etc. An I/O interface is impacted by a vulnerability if the ECU of the I/O interface is vulnerable, such as when the ECU utilizes a software component affected by the vulnerability. The I/O interface may be identified from collected metadata. The impact score may be generated based at least on an I/O interface that is impacted by the vulnerability. For example, each I/O interface may be assigned a predetermined score that is added to the impact score when the I/O interface is affected by the vulnerability.

The impact analysis process 223 includes checking if the vulnerability impacts the system of the connected vehicle based on the connected vehicle's system configuration (FIG. 6, 244). The system configuration may be indicated in the collected metadata. The system configuration of the connected vehicle may be read from configuration files, etc. A configuration file may indicate functions, libraries, I/O interfaces, and other components that are utilized or not utilized in the connected vehicle. The configuration file may also indicate how the components are configured. The vulnerability impacts the connected vehicle's system if the system configuration indicates that the vulnerability affects an ECU or software component thereof that is enabled or present in the connected vehicle. The impact score may be generated based at least on the connected vehicle's system configuration.

The impact analysis process 223 includes checking if a vulnerable library can be loaded at startup (FIG. 6, 245). The impact score may be generated based at least on whether a library or one or more components of the library can be loaded at startup.

The impact analysis process 223 includes checking if a vulnerable library or function can be used in the connected vehicle (FIG. 6, 246). The impact score may be generated based at least on whether a vulnerable library or function can be used in the system.

Referring back to FIG. 4, the intrinsic risk analysis process 224 determines the intrinsic risk posed by the vulnerability. The intrinsic risk is based on intrinsic qualities or characteristics of the vulnerability without regard to the particulars of the connected vehicle. The intrinsic risk analysis process 224 generates an intrinsic score, which is indicative of the intrinsic risk posed by the vulnerability to the connected vehicle.

The intrinsic risk analysis process 224 is now further explained with reference to FIG. 6 (FIG. 4, node H to FIG. 6, node H). The intrinsic risk analysis process 224 includes determining a base score of the vulnerability (FIG. 6, 247). The base score may be a predetermined score assigned to the vulnerability by a third-party organization. In one embodiment, the base score is a CVSS score. The CVSS score may be received by the automotive cybersecurity platform (e.g., from a vulnerability alert) and stored in the vulnerability database for later retrieval (FIG. 6, node C to FIG. 2, node C). The intrinsic score may be based at least on the base score.

An overall risk score of the vulnerability may be determined based at least on the threat score generated from the threat analysis process 222, the impact score generated from the impact analysis process 223, and the intrinsic score generated from the intrinsic risk analysis process 224 (FIG. 6, 248). For example, the threat score may be generated by adding up scores that are assigned depending on the existence and maturity of an exploit code (FIGS. 5, 231 and 232), test result of a simulated attack on the connected vehicle (FIGS. 5, 233 and 234), and vulnerable ECUs along the attack path (FIGS. 5, 235 and 236). As another example, the impact score may be generated by adding up scores that are assigned depending on whether the vulnerability impacts I/O interfaces (FIG. 6, 234), whether the system configuration of the connected vehicle indicates that the vulnerability affects the connected vehicle (FIG. 6, 244), whether a vulnerable library can be loaded at system startup (FIG. 6, 245), and whether a vulnerable library or function can be used in the connected vehicle (FIG. 6, 246). Yet another example, the intrinsic score may simply be the base score that is assigned to the vulnerability by a third-party organization. The overall risk score of the vulnerability may be calculated as, Overall Risk Score=(threat score)×(impact score)×(intrinsic score).

As can be appreciated, weights, scaling factors, etc. may be applied to the overall risk score or individual scores. Vulnerabilities may be prioritized based on their overall risk scores. The higher the overall risk score, the higher the priority to remediate the vulnerability. Remediating the vulnerability may include updating or replacing the vulnerable software component, for example.

Figure 7:
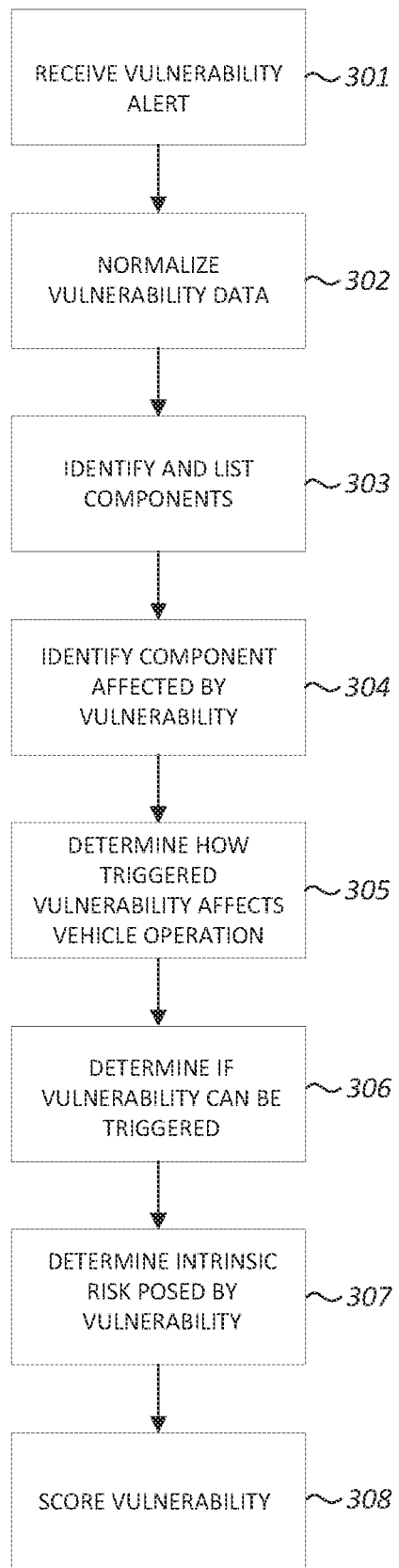
FIG. 7 shows a flow diagram of a method of analyzing vulnerabilities of connected vehicles in accordance with an embodiment of the present invention.

FIG. 7 shows a flow diagram of a method of analyzing vulnerabilities of connected vehicles in accordance with an embodiment of the present invention. The method of FIG. 7 may be performed by or on the cybersecurity platform 101 of FIG. 1. As can be appreciated, the method of FIG. 7 may also be performed on or by other computer systems without detracting from the merits of the present invention.

In the example of FIG. 7, an automotive cybersecurity platform receives a vulnerability alert from a vulnerability source (FIG. 7, step 301). The vulnerability alert may include a CVE record, cyber threat news, or other vulnerability data pertaining to one or more vulnerability that may affect a connected vehicle. Vulnerability data from the vulnerability ability alert are normalized and stored in a vulnerability database (FIG. 7, step 302). Software components of a connected vehicle are identified and listed in a software bill of materials (FIG. 7, step 303). Software components of the connected vehicle that are affected by a vulnerability are identified (FIG. 7, step 304), for example by comparing the contents of the software bill of materials to the contents of vulnerability database.

How the triggered vulnerability negatively affects the connected vehicle is determined (FIG. 7, step 305), for example by checking for existence and maturity of an exploit code, simulating an attack on the connected vehicle, and identifying vulnerable ECUs along the attack path. It is further determined whether the vulnerability can be triggered (FIG. 7, step 306), for example by checking if the vulnerability impacts I/O interfaces, whether the system configuration of the connected vehicle indicates that the vulnerability affects the connected vehicle, whether a vulnerable library can be loaded at system startup, and whether a vulnerable library or function can be used in the connected vehicle. The intrinsic risk posed by the vulnerability is also determined (FIG. 7, step 307). An overall risk score of the vulnerability is determined based at least on the above-noted determinations involving the vulnerability (FIG. 7, step 308).

Figure 8:
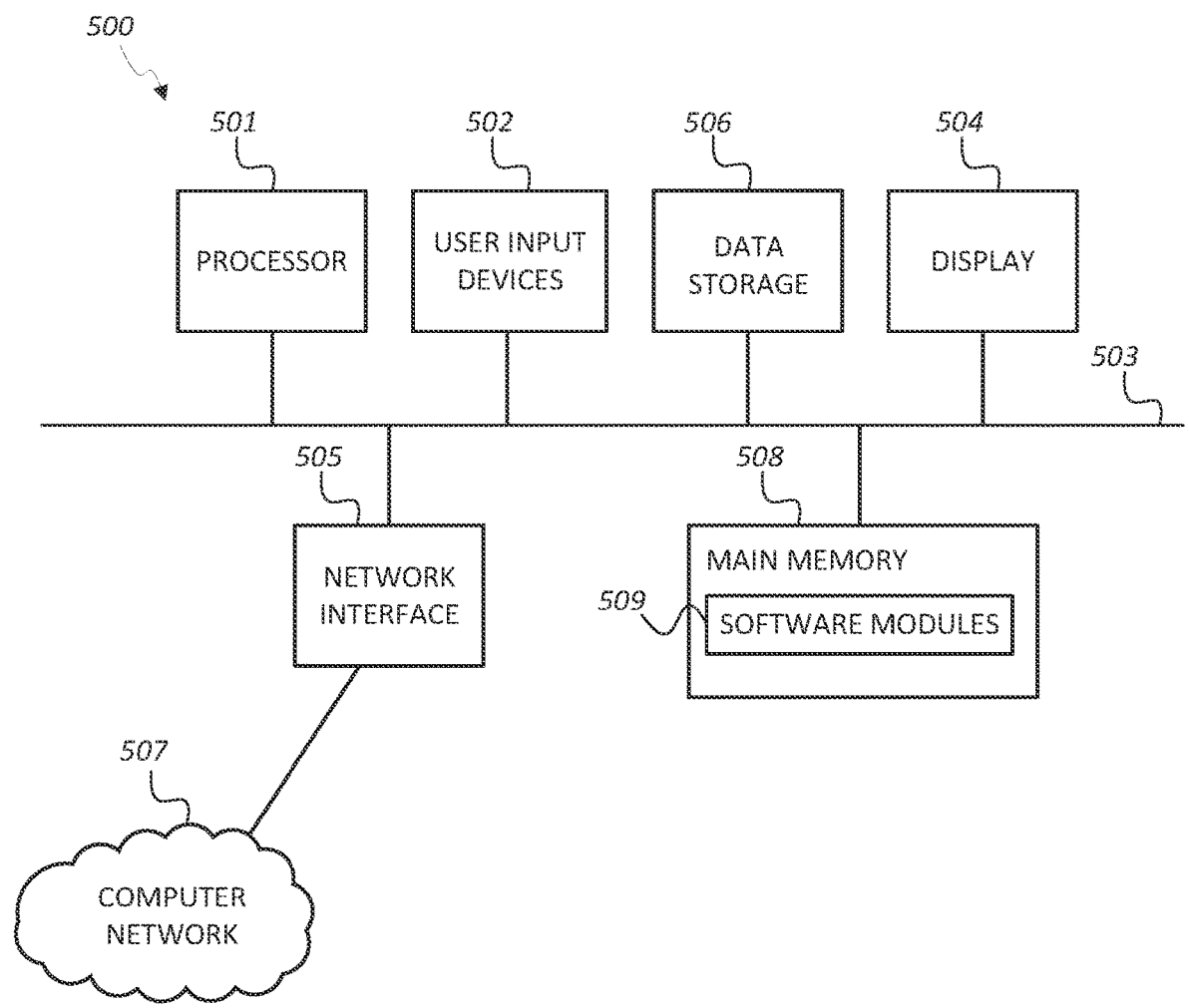
FIG. 8 shows a logical diagram of a computer system that may be employed with embodiments of the present invention.

Referring now to FIG. 8, there is shown a logical diagram of a computer system 500 that may be employed with embodiments of the present invention. The computer system 500 may be employed as an automotive cybersecurity flatform or other computer system described herein. The computer system 500 may have fewer or more components to meet the needs of a particular cybersecurity application. The computer system 500 may include one or more processors 501. The computer system 500 may have one or more buses 503 coupling its various components. The computer system 500 may include one or more user input devices 502 (e.g., keyboard, mouse, joystick, touchscreen, buttons), one or more data storage devices 506 (e.g., hard drive, optical disk, solid state drive), a display screen 504 (e.g., liquid crystal display, flat panel monitor), a computer network interface 505 (e.g., network adapter, modem), and a main memory 508 (e.g., random access memory). The computer network interface 505 may be coupled to a computer network 507, which in this example includes the Internet.

The computer system 500 is a particular machine as programmed with one or more software modules 509, comprising instructions stored non-transitory in the main memory 508 for execution by at least one processor 501 to cause the computer system 500 to perform corresponding programmed steps. An article of manufacture may be embodied as computer-readable storage medium including instructions that when executed by at least one processor 501 cause the computer system 500 to be operable to perform the functions of the one or more software modules 509.

Methods and systems for analyzing vulnerabilities of connected vehicles have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of analyzing vulnerabilities of connected vehicles, the method comprising:
    receiving a vulnerability alert from a vulnerability source;
    identifying a plurality of software components that are utilized in electronic control units (ECUs) of a connected vehicle;
    collecting metadata of library dependencies and symbol tables of the plurality of software components;
    determining if any of the plurality of software components is affected by a vulnerability indicated in the vulnerability alert;
    identifying a software component of the plurality of software components having the vulnerability;
    determining if the vulnerability can be triggered in the connected vehicle by determining, from the metadata of library dependencies and symbol tables, whether the software component can be loaded during startup of an ECU of the connected vehicle;
    determining how the vulnerability negatively affects the connected vehicle when the vulnerability is triggered in the connected vehicle;
    determining an overall risk score of the vulnerability based at least on whether the vulnerability can be triggered in the connected vehicle and how the vulnerability negatively affects the connected vehicle when the vulnerability is triggered in the connected vehicle; and
    prioritizing remediation of the vulnerability based at least on the overall risk score.

2. The method of claim 1, wherein determining if the vulnerability can be triggered in the connected vehicle includes:
    checking if the vulnerability impacts an input/output interface of the connected vehicle.

3. The method of claim 1, further comprising:
    normalizing vulnerability data of the vulnerability alert to generate normalized vulnerability data.

4. The method of claim 3, wherein determining if any of the plurality of software components is affected by the vulnerability indicated in the vulnerability alert comprises:
    comparing contents of a software bill of materials of the connected vehicle with contents of the normalized vulnerability data.

5. The method of claim 1, wherein the vulnerability alert includes a Common Vulnerabilities and Exposures (CVE) information.

6. The method of claim 1, wherein determining how the vulnerability negatively affects the connected vehicle when the vulnerability is triggered in the connected vehicle comprises:
    performing a simulated attack on the connected vehicle, the simulated attack being configured to exploit the vulnerability.

7. The method of claim 1, wherein determining how the vulnerability negatively affects the connected vehicle when the vulnerability is triggered in the connected vehicle comprises:
    determining which of the ECUs of the connected vehicle are affected by the vulnerability.

8. The method of claim 1, wherein the overall risk score of the vulnerability is based at least on a base score assigned to the vulnerability by a third-party organization and is a measure of an intrinsic risk posed by the vulnerability.

9. The method of claim 8, wherein the base score is a Common Vulnerability Scoring System (CVSS) score.

10. A system for analyzing vulnerabilities of connected vehicles, the system comprising:
    a connected vehicle having an Electronic Control Unit (ECU) that includes a software component; and
    an automotive cybersecurity platform comprising at least one processor and a memory, the memory storing instructions that when executed by the at least one processor cause the automotive cybersecurity platform to:
    collect metadata of library dependencies and symbol tables of software components utilized in the connected vehicle;
    receive a vulnerability alert;
    determine if the software component is affected by a vulnerability indicated in the vulnerability alert;
    determine if the vulnerability can be triggered by determining, from the metadata of library dependencies and symbol tables, whether the software component can be loaded during startup of the ECU;
    determine how the vulnerability negatively affects the connected vehicle when the vulnerability is triggered; and
    determine an overall risk score of the vulnerability based at least on whether the vulnerability can be triggered and how the vulnerability negatively affects the connected vehicle when the vulnerability is triggered.

11. The system of claim 10, wherein the instructions stored in the memory of the automotive cybersecurity platform, when executed by the at least one processor of the automotive cybersecurity platform, cause the automotive cybersecurity platform to:
    normalize vulnerability data of the vulnerability alert to generate normalized vulnerability data.

12. The system of claim 11, wherein the instructions stored in the memory of the automotive cybersecurity platform, when executed by the at least one processor of the automotive cybersecurity platform, cause the automotive cybersecurity platform to determine if the software component is affected by the vulnerability indicated in the vulnerability alert by:
    comparing contents of a software bill of materials of the connected vehicle to contents of the normalized vulnerability data.

13. The system of claim 10, wherein the vulnerability alert includes a Common Vulnerabilities and Exposures (CVE) information.

14. The system of claim 10, wherein the instructions stored in the memory of the automotive cybersecurity platform, when executed by the at least one processor of the automotive cybersecurity platform, cause the automotive cybersecurity platform to determine if the vulnerability can be triggered in the connected vehicle by:
   checking if the vulnerability impacts an input/output VO interface of the connected vehicle.

15. The system of claim 10, wherein the instructions stored in the memory of the automotive cybersecurity platform, when executed by the at least one processor of the automotive cybersecurity platform, cause the automotive cybersecurity platform to determine the overall risk score of the vulnerability based at least on a base score assigned to the vulnerability by a third-party organization and is a measure of an intrinsic risk posed by the vulnerability.

16. The system of claim 15, wherein the base score is a Common Vulnerability Scoring System (CVSS) score.

17. A method of analyzing vulnerabilities of connected vehicles, the method comprising:
   collecting metadata of library dependencies and symbol tables of software components of a connected vehicle;
   receiving a vulnerability alert;
   determining if a software component utilized in an Electronic Control Unit (ECU) of the connected vehicle is affected by a vulnerability indicated in the vulnerability alert;
   determining if the vulnerability can be triggered by determining, from the metadata of library dependencies and symbol tables, whether the software component can be loaded during startup of the ECU;
   performing a simulated attack on the connected vehicle; and
   determining an overall risk score of the vulnerability based at least on whether the vulnerability can be triggered in the connected vehicle and a result of the simulated attack on the connected vehicle.

18. The method of claim 17, wherein determining if the software component utilized in the ECU of the connected vehicle is affected by the vulnerability indicated in the vulnerability alert comprises:
   identifying software components of the connected vehicle;
   listing the identified software components in a software bill of materials; and
   comparing contents of the software bill of materials to vulnerability data of the vulnerability alert.

19. The method of claim 17, wherein the vulnerability alert includes a Common Vulnerabilities and Exposures (CVE) information.

20. The method of claim 17, further comprising:
   determining the overall risk score of the vulnerability based at least on a base score assigned to the vulnerability by a third-party organization and is a measure of an intrinsic risk posed by the vulnerability.

\* \* \* \* \*